June 24, 1930.　　W. A. CHRYST　　1,766,880

UNIVERSAL JOINT FOR SHOCK ABSORBERS

Filed July 18, 1928

Inventor
William A. Chryst
By Spencer Hardman & Fehr
His Attorneys

Patented June 24, 1930

1,766,880

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

UNIVERSAL JOINT FOR SHOCK ABSORBERS

Application filed July 18, 1928. Serial No. 293,758.

This invention relates to an isolating nonmetallic pivot joint connecting two metal parts.

An object of the invention is to provide a simple and efficient form of pivot joint having a resilient non-metallic bushing therein which provides for all relative movement between the connected parts by internal distortion within the non-metallic material, whereby looseness, rattle, wear, and necessity for lubrication is avoided.

Further objects and advantages of the present invention will be apparent from the following description, reference being had to the accompanying drawings, wherein a preferred embodiment of one form of the present invention is clearly shown.

In the drawings.

Similar reference characters refer to similar parts throughout the several drawings.

Figure 1:
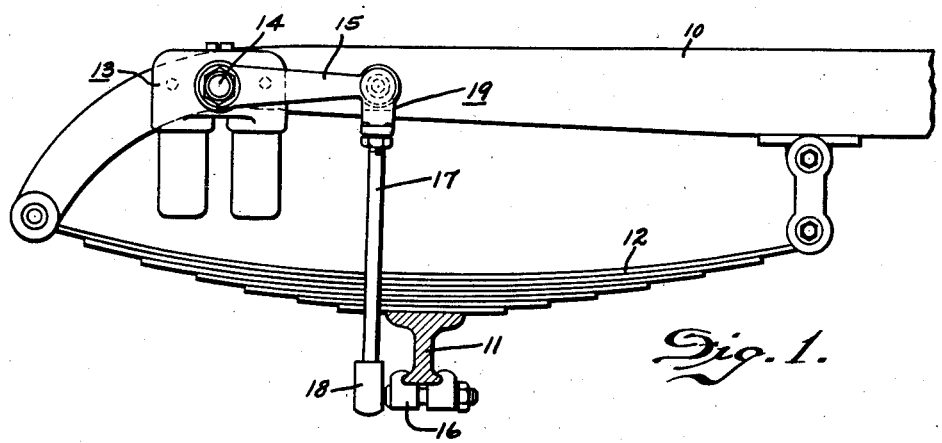
Fig. 1 is a somewhat diagrammatic view showing parts of the front end of an automobile chassis equipped with a hydraulic shock absorber, and also showing the thrust link connected to the shock absorber lever arm by the pivot joint of this invention.
Figure 2:
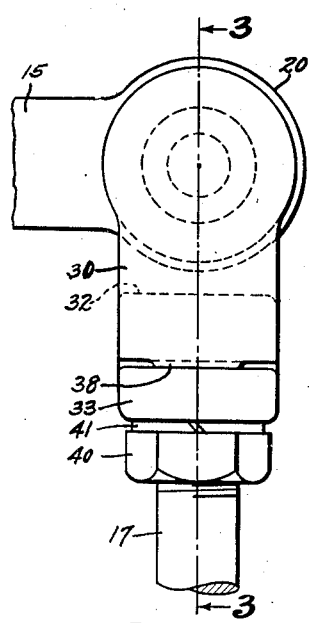
Fig. 2 is a side elevation on a larger scale of the pivot joint of this invention.

In Fig. 1, 10 designates the front end of the chassis frame side rail, 11 the front axle, 12 the semi-elliptic leaf spring connecting the frame and axle in the ordinary manner, and 13 a double cylinder hydraulic shock absorber unit which is rigidly fixed to the side rail 10. Unit 13 has a laterally projecting rocker shaft 14 having a lever arm 15 fixed thereto. The outer end of lever arm 15 is pivotally connected to the upper end of thrust link 17 by means of the pivot joint indicated as a whole by 19, and the lower end of link 17 is pivoted by the pivot joint 18 to the fitting 16 which is rigidly fixed to axle 11. Therefore link 17 is under compression when axle 11 is moving up and thereby causing arm 15 to swing counter-clockwise against the resistance of the hydraulic pistons within unit 13, and is under tension when axle 11 is moving down. The general arrangement of the parts so far described form no part of the present invention and hence are not disclosed in greater detail, this invention relating to the improved form of pivot joint 19.

Figure 3:
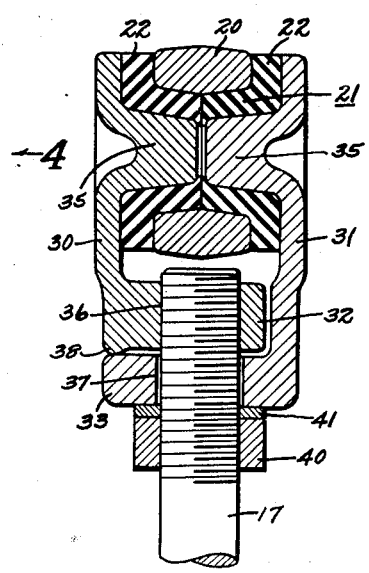
Fig. 3 is a section on line 3—3 of Fig. 2.
Figure 4:
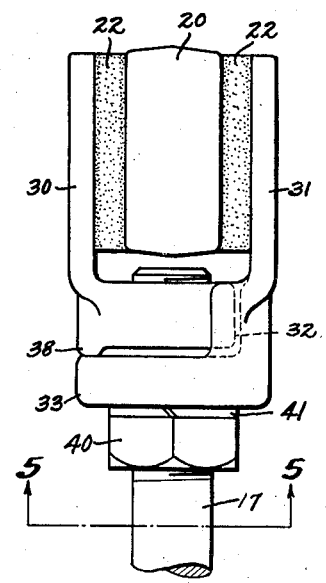
Fig. 4 is an end elevation looking in the direction of arrow 4 in Fig. 2.
Figure 5:
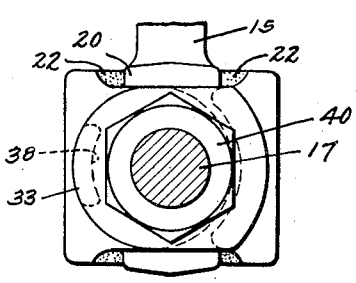
Fig. 5 is a bottom view taken on line 5—5 of Fig. 4.

The outer end of lever arm 15 has an eye member 20 preferably integral therewith. Inserted and snugly fitting within the eye 20 is a soft resilient rubber bushing 21 having annular end flanges 22 which overlap and contact with the end surfaces of eye member 20. If desired, bushing 21 may be made in two parts, as shown in Fig. 3, in order to facilitate its insertion into the eye 20. Clamped laterally upon opposite ends of the rubber bushing 21 are the metal clamps 30 and 31, each of these clamps having an inwardly projecting central lug 35 fitting tightly within rubber bushing 21 interiorly of eye 20. Clamps 30 and 31 have depending projections 32 and 33 respectively which mutually overlap exterior of eye member 20 and are provided with aligned apertures centered on the center line through eye member 20. Link 17 is screw-threaded into aperture 36 in projection 32 and passes loosely through the somewhat larger aperture 37 in projection 33. Projection 32 has a depending ridge 38 on its outer lower edge against which the other projection 33 abuts when the nut 40 is screwed upwardly (as shown in Fig. 3), by which means the end clamp 31 is caused to tilt inwardly a small amount towards the rubber bushing 21 as will be obvious from Fig. 3.

In assembling this pivot joint, the rubber bushing 21 may be first inserted properly in place in the eye 20, or, if this bushing is made in halves as shown, the separate halves thereof may be telescoped over the central lugs 35 on the separated clamps 30 and 31 respectively. In either case, clamps 30 and 31 are then moved into position on opposite sides of eye 20 and they are then forced toward each other by any suitable means until the rubber is compressed somewhat and the holes 36 and 37 brought into alignment. The threaded end of link 17 with nut 40 and lock washer 41 thereon is then passed through hole 37 and threaded into hole 36 to rigidly fix clamp 30 thereupon. Now when nut 40 is screwed up tight against the lower projection 33 it causes the entire clamp 31 to tilt inwardly, due to pivoting on the ridge 38 and so puts the soft rubber bushing 21 under the desired initial compression. Lock washer 41 prevents loosening of nut 40 and so maintains the adjusted compression upon the rubber material. This initial compression will cause the rubber to grip its confining metal walls. Hence all relative movement between eye member 20 and the metal parts 30, 31 will be taken by an internal distortion within the rubber material itself. It will be clear from Fig. 1 that the joint 19 is primarily a pivot joint, but that it must also accommodate some relative lateral movement or "side sway" between frame 10 and axle 11. This sidesway movement is accommodated by joint 19 by a lateral tilting of clamps 30, 31 relative to eye member 20, which tilting is permitted by the yieldability of the soft rubber which holds these parts in spaced relation. In other words joint 19 is primarily a pivot joint but is also a universal joint for small lateral angular movements.

The joint 18 at the lower end of link 17 may be a substantial duplicate of the upper joint 19, or if desired, it may be a simple form of universal joint such as a ball and socket joint.

While the form of embodiment of the present invention as herein disclosed, constitutes a preferred form, it is to be understood that other forms might be adopted, all coming within the scope of the claims which follow.

What is claimed is as follows:

1. A pivot joint connecting two relatively movable parts comprising: a fixed eye member on one of said parts, a resilient non-metallic bushing within said eye and having annular end flanges overlapping the end surfaces of said eye member, two opposed complementary clamps clamped laterally upon said end flanges and each having a central lug fitting snugly within said bushing whereby the resilient material of said bushing is put under initial compression, said opposed clamps each being rigidly fixed to the second of said movable parts.

2. A pivot joint connecting two relatively movable parts comprising: a fixed eye member on one of said parts, a resilient non-metallic bushing within said eye and having annular end flanges overlapping the end surfaces of said eye member, two opposed clamps clamped laterally upon said non-metallic bushing and each having a central lug fitting snugly within said bushing, said clamps having mutually overlapping projections exterior of said eye, and means for rigidly fixing said projections to the second of said movable parts.

3. A pivot joint connecting two relatively movable parts comprising: a fixed eye member on one of said parts, a resilient non-metallic bushing within said eye and having annular end flanges overlapping the end surfaces of said eye member, two opposed clamps clamped laterally upon said non-metallic bushing and each having a central lug fitting snugly within said bushing, said clamps having mutually overlapping projections exterior of said eye, the second of said movable parts extending through aligned holes in said overlapping projections and holding said opposed clamps rigidly in fixed position.

4. A pivot joint connecting two relatively movable parts comprising: a fixed eye member on one of said parts, a resilient non-metallic bushing within said eye and having annular end flanges overlapping the end surfaces of said eye member, two opposed clamps clamped laterally upon said non-metallic bushing and each having a central lug fitting snugly within said bushing, said clamps having mutually overlapping projections exterior of said eye, the second of said movable parts having threaded engagement with one of said projections and extending loosely through said other projection, and a nut threaded upon said second part for clamping said projections rigidly in place.

5. A pivot joint connecting two relatively movable parts comprising: a fixed eye member on one of said parts, a resilient non-metallic bushing within said eye and having annular end flanges overlapping the end surfaces of said eye member, two opposed clamps clamped laterally upon said non-metallic bushing and each having a central lug fitting snugly within said bushing, said clamps having mutually overlapping projections exterior of said eye, the second of said movable parts extending through aligned holes in said overlapping projections and means for tilting said opposed clamps toward each other and clamping them in tilted position rigidly upon said second movable part.

In testimony whereof I hereto affix my signature.

WILLIAM A. CHRYST.